United States Patent Office 2,909,040
Patented Oct. 20, 1959

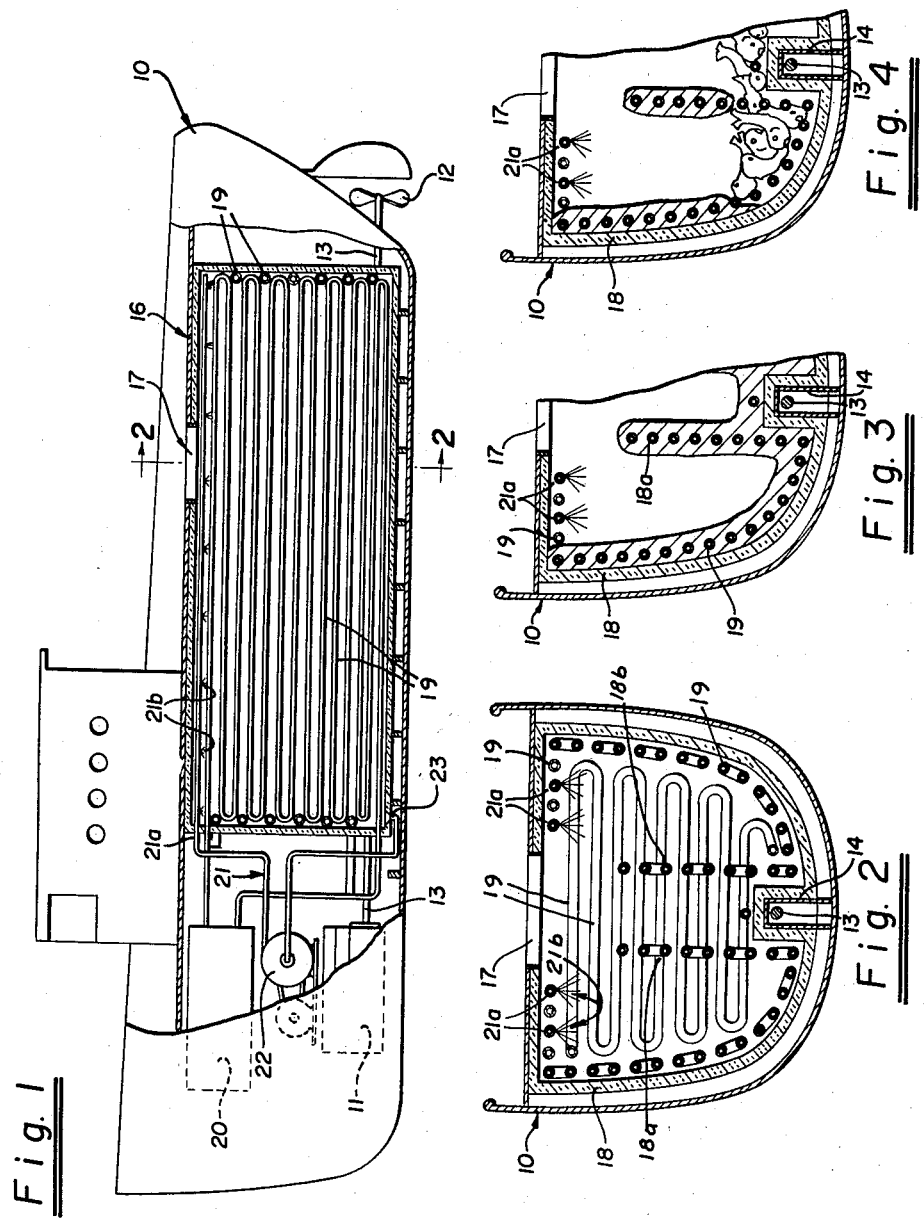

2,909,040

APPARATUS AND METHOD FOR FREEZING FISH

Malcolm L. Newell, San Pedro, Calif.

Application December 13, 1957, Serial No. 702,584

4 Claims. (Cl. 62—59)

This invention relates to apparatus and method of freezing fish and particularly to such an apparatus and method which is adapted to be used immediately after the fish are caught in the ocean, as for example, by purse seining.

In large scale fishing operations in which tuna, for example, are caught, it is common practice for a vessel having a capacity of one hundred to three hundred tons of fish to leave its home port and seek fish many thousands of miles therefrom. Schools of fish are hunted and, when found, as many of the school are caught as the boat or fleet can handle. In a typical purse seining operation the net is floated from corks or other buoyant members and fishermen position the net entirely about the school with the net hanging downwardly from these floats in a more or less perpendicular manner. When the net has been properly positioned, its bottom is closed; hence the term purse seining. The net is then made smaller and smaller with the result that the fish are more heavily concentrated until the desired degree of concentration of fish is achieved. Catches of two hundred tons of fish have been made in a single purse seining operation.

It is apparent that when fish are caught in this manner they must be brought aboard the vessel and chilled as rapidly as possible. The handling of a hundred tons of fish, for example, imposes a tremendous burden and hardship upon the crew of the vessel and upon the vessel itself.

In a conventional operation a catch may be divided into groups of say twenty tons apiece and each group of twenty tons of fish handled as a unit. The fish are customarily brought from the net to the deck of the vessel and are then packed below.

Generally speaking there are two types of vessels which are used in operations of this character. The first of these is the so-called ice boat. A typical ice boat is provided with an enlarged hold for the keeping of the fish and the ice in crushed form is put in the vessel before the vessel leaves its home port. Let it be assumed that a vessel is adapted to haul one hundred tons of fish. She may have to leave port with forty or fifty tons of ice. When the fish are placed in the hold the crew or some members thereof must go below, position the fish and spread the ice over the fish. This part of the operation has several disadvantages. In the first place the entire crew is usually required to bring the fish on deck and the fish will be placed on deck in the hot sun, and the fish, instead of being packed when their body temperature is that of the water in which they are caught (70° to 80° F.), will be packed when their body temperature may be possibly 100° F. This additional heat must of course be dissipated and the spoilage starts more promptly in hot fish and continues at a more rapid rate.

Thus in the conventional ice boat operation the fish are frequently allowed to become warmer than their natural condition and when they are placed in the ice hold spoilage may already have begun.

The economics of a fishing operation require this mode of handling. For example the boat can only support a certain number of fishermen. Even under present conditions these men are idle a good period of time. However when fish are being caught the fishermen work the clock around and thus the difficulties which I have previously pointed out, that is, the difficulties created by permitting the fish to lie on the deck before they are frozen is one which might theoretically be avoided but which cannot be prevented from a practical standpoint.

A brine boat on the other hand consists of a plurality of tanks of possibly twenty to thirty tons capacity each. These tanks may all be filled with chilled sea water, but as the tanks are used to carry fuel and fresh water, it is usually not possible to have a reserve of cold water on hand. Thus, with a single catch of a hundred tons or so, the brine boat suffers from more or less the same difficulty as an ice boat; that is its refrigerating capacity is not in condition to accommodate a very large catch within a short period of time, as for example, a period of a day.

When a tank is filled with fish, the fish are frozen and the brine is then pumped out of the tank leaving the fish in a frozen condition. Refrigeration is maintained solely by the refrigerating coils on the side walls of the tank. Brine is added to the tank to thaw the fish during unloading.

In both operations, that is loading and unloading from an ice boat, there is considerable waste and spoilage. In an ice boat for example the fishermen have to walk about on the catch as it is placed in the bins in order to place the ice on the fish and it is apparent that a heavy man walking on warm fish will frequently result in tearing of the skin, etc. Moreover when the fish and ice are removed at the time the boat is unloaded, further destruction and deterioration occurs.

It is an object of this invention to provide a novel fishing vessel and method which incorporates a system for maintaining frozen fish and which does so with a minimum of cost for the vessel and with a minimum of destruction and deterioration to the fish and a minimum amount of time and labor for loading and unloading.

It is a further object of this invention to provide a boat of this kind which can receive and accommodate a very large catch without requiring the handling of a fish as required in an ice boat.

Other objects and advantages of this invention will appear from the following specification taken in conjunction with the accompanying drawing in which:

Figure 1 represents a side elevation view, partially in cross-section of a boat incorporating my invention;

Figure 2 represents a cross-sectional detail along the line 2—2 of Figure 1 showing the coils in a normal condition;

Figure 3 is a fragmentary view taken along the line 2—2 of Figure 1 showing a coating of ice as the same is built up over the freezing coils, and Figure 4 illustrates a view, similar to that of Figure 3, in which fish have been stored in the tank and showing the disappearance of some of the ice from the coils.

As illustrated particularly in Figure 1, I provide a vessel 10 which is more or less conventional and which is adapted to be driven by an engine 11 through a propeller 12 which is connected to the engine 11 by a propeller shaft 13 which is accommodated in a tunnel or housing 14.

A suitable single tank 16 is provided in the vessel. The tank is heavily insulated and is of as large a size as is possible to accommodate within a particular hull. The tank conforms generally to the outlines of the hull in a transverse plane and is provided with a hatch 17 through which the fish may be introduced. As previously indicated the walls are heavily insulated as by means of insulating material 18 and the tank is lined along its sides and across its ends by refrigerating coils 19. Refrigerant is supplied to the coils through a compressor and pump assembly 20. The coils 19, as previously pointed out not only line the bottom, side, end and top walls of the tank but I have provided two banks of coils 18a and 18b which are parallel to each other and which extend lengthwise of the tank 16.

A brine circulating system 21 is provided and is operated by a pump 22. The brine is circulated through pipes 21a which are placed adjacent the top wall of the tank and is sprayed into the tank, over the coils 19 and the banks of coils 18a, and over any fish which may be in the tank. The brine is exhausted from the tank through a sump 23 by the pump 22 and recirculated through the header 21a and the spray nozzles 21b.

Generally speaking the coils are spaced on about 12 inch centers about the walls and in the two batteries of coils at the center. This system has been utilized in connection with a construction of a particular vessel in which the tank is possibly thirty-five feet long, twenty feet wide and seven feet deep and is adapted to accommodate approximately 100 tons of tuna. Cold brine is circulated through the nozzles 21b at about 400 gallons of brine per minute. As illustrated in the drawings, I indicate only one general refrigeration circuit. It is to be understood however that the refrigeration coils 19 and the banks 18a and 18b may be on a number of circuits. Each circuit would supply a section of cooling coils at different zones or levels. Those at the bottom for example would be on one circuit, those half way up the sides of the vessel and in the banks 18a and 18b, would be on a second circuit, and those coils above would be on a third circuit. This is a mechanical detail and will simply provide a more economical operation. However it does not constitute an important part of this invention.

It must be kept in mind that fish are caught in sea water up to 85° F. The fish would therefore come aboard at about that temperature. I desire to reduce the temperature of the fish to 30° F. within twenty-four hours as it has been found that when fish are frozen within twenty-four hours there is little or no spoilage.

It is necessary to keep the salt concentration of the spray down in order to prevent salt penetration of the fish. Salt penetration does not ordinarily occur after the fish or its surface is chilled and therefore I find that a light brine is more advantageous during the preliminary chilling operation and that a heavier brine may be used after the fish is chilled. This will naturally occur in my system since the ice forming on the coils initially will tend to be pure water, effecting a gradual increase in the salinity of the circulating brine. The increased salinity in turn provides a secondary benefit in that ice forms on the coils at progressively lower temperatures substantially lower than the normal freezing points of either the brine or the fish.

Operation of my particular boat and refrigeration system may be described as follows:

The refrigeration system is caused to operate and coolant is passed through the coils 19. Sea water is sprayed through the nozzles 21b. The same sea water is recirculated by pump 22. Only sufficient water to maintain suction to pump 22 is placed in the tank. More sea water is added as the sea water is converted into ice on the refrigeration coils, as illustrated in Figure 3. It will be seen that prior to loading caught fish this reserve ice occupies a substantial volume in the storage tanks, perhaps as much as 15 to 20%. The brine circulating system is then shut off and the ice remains substantially as illustrated in Figure 3.

When a catch of fish is netted, the purse seining operation is substantially identical to that previously described, that is, the net is pursed into a number of small purses and the contents of each purse is brought aboard. The fish are introduced to the tank 16 through the open hatch 17 where they immediately go to the bottom of the tank and into contact with the reserve of ice on the coils 18a and 18b. Brine is sprayed into the tank through the nozzles 21b and then recirculated through the sump 23 back over the fish. The fish are also in engagement with the ice at the bottom of the vessel around the coils 19.

The fish do not freeze in a block of ice as they do in an ice boat. Their temperature is reduced and they lie one on top of the other in a frozen condition. They are rigid and do not tend to adhere one to the other. As indicated in Figure 4 the ice on the coils 19 and 18a and 18b above the upper level of the fish remains in solid form and constitutes a reserve refrigeration capacity useful for other fish when the same are introduced into the hold. When the fish are cooling this ice melts but when the fish are brought down to temperature the ice starts to form again.

The construction of a boat having a single tank as illustrated in the drawings is less expensive than the construction of separate tanks which are required in a brine boat. In addition a boat of this character requires less refrigeration capacity than a brine boat. In using my system and apparatus I build up reserve refrigeration with the minimum of equipment. Because of my reserve refrigeration I can cool a load more quickly with the same refrigeration equipment because of the cycling of the cold brine through the load and over the ice formed in the coils.

In utilizing my system I reduce the labor required and provide better keeping and handling conditions. For example, in an ice boat operation the fishermen have to pack the fish, crush the ice and cover the fish with ice. In unloading they have to crack the ice loose and remove the fish by hand.

There would appear to be little or no savings in labor in my system over that of a brine boat except however that it is far easier to load fish in a single tank than in a number of tanks as must be done in a brine boat. However, the problems of salt penetration and injury to fish on handling are greatly reduced. Moreover operating expenses are less than those of a brine boat because I have only one pump to circulate the brine whereas in a brine boat at least one pump must be had for each tank.

I have found that in a boat utilizing my construction and method the keeping quality of the fish are equal to those of a brine boat and better than those of an ice boat.

The construction which I have developed is the only type of vessel and the only method of refrigerating fish that can receive and begin to freeze a full load of fish in a twenty-four hour period, and which will maintain the fish as separate frozen units thereafter.

It is apparent, although I have referred to tuna only, that my boat can also be utilized in connection with the fishing for sardines and other fish.

I claim:

1. In a method for freezing fish in a fishing boat, and by which unusually large amounts of fish can be quickly frozen as separate units, the steps of continuously supplying a refrigerant from a closed refrigeration system to coils extending all about the bottom, sides and ends of a fish receiving zone and through intermediate banks therein, circulating brine in a second system from the bottom of said zone into a spray falling over said coils whereby a reserve layer of ice is built up on said coils, introducing fish into said zone and into direct contact with said layer of ice to promote an initial cooling of the fish, collecting sprayed and melted brine in the bottom of said zone and recycling the same over and into direct contact with the fish until the fish are frozen, and continuing the circulation of the brine to maintain the frozen fish as separate units.

2. The method as in claim 1 wherein additional brine is added to replace that freezing as a layer of ice on said coils.

3. In a method for freezing fish in a fishing boat, and by which unusually large amounts of fish can be quickly frozen as separate units, the steps of continuously supplying a refrigerant from a closed refrigeration system to coils extending all about the bottom, sides and ends of a fish receiving zone and through an intermediate bank therein, circulating brine in a second system from the bottom of said zone into a spray falling over said coils whereby a reserve layer of ice is built up on said coils, introducing fish into said zone and into direct contact with said layer of ice to promote an initial cooling of the fish, collecting sprayed and melted brine in the bottom of said zone and recycling the same over and into direct contact with the fish until the fish are frozen, and continuing the circulation of the brine to maintain the frozen fish as separate units.

4. The method as in claim 3 wherein additional brine is added to replace that freezing as a layer of ice on said coils.

References Cited in the file of this patent

UNITED STATES PATENTS

| | | |
|---|---|---|
| 1,468,050 | Taylor | Sept. 18, 1923 |
| 1,881,079 | Hiller | Oct. 4, 1932 |
| 1,940,192 | Sorber | Dec. 19, 1933 |
| 1,942,307 | Reeh | Jan. 2, 1934 |
| 1,947,327 | Brettell | Feb. 13, 1934 |
| 2,000,440 | Forman | May 7, 1935 |
| 2,153,980 | Feldbush | Apr. 11, 1939 |
| 2,364,154 | Markley | Dec. 5, 1944 |
| 2,529,651 | Davis | Nov. 14, 1950 |
| 2,713,248 | Cann | July 19, 1955 |
| 2,713,251 | Cann Sr. et al. | July 19, 1955 |